United States Patent [19]

Reiser

[11] Patent Number: 4,928,084

[45] Date of Patent: May 22, 1990

[54] COMBINED MESSAGE DISPLAY AND BRAKE LIGHT

[76] Inventor: Steven M. Reiser, 1900 Almont Ave., #107, Anaheim, Calif. 92805

[21] Appl. No.: 300,790

[22] Filed: Jan. 23, 1989

[51] Int. Cl.$^5$ ............................................. B60Q 1/44
[52] U.S. Cl. .................................... 340/479; 340/471; 340/469; 340/478
[58] Field of Search ............... 340/479, 469, 471, 478, 340/321

[56] References Cited

U.S. PATENT DOCUMENTS

| | | | |
|---|---|---|---|
| 3,389,389 | 6/1968 | Minear | 340/339 |
| 3,665,392 | 5/1972 | Annas | 340/67 |
| 3,750,138 | 7/1973 | Burgan et al. | 340/334 |
| 4,162,493 | 7/1979 | Ross et al. | 340/752 |
| 4,361,828 | 11/1982 | Hose | 340/107 |
| 4,431,984 | 2/1984 | Bileck | 340/107 |
| 4,464,649 | 8/1984 | Her | 340/471 |
| 4,556,862 | 12/1985 | Meinershagen | 340/479 |
| 4,574,269 | 3/1986 | Miller | 340/97 |
| 4,631,516 | 12/1986 | Clinker | 340/76 |
| 4,661,795 | 4/1987 | Cameron | 340/71 |
| 4,682,146 | 7/1987 | Friedman, III | 340/471 |
| 4,791,401 | 12/1988 | Heidman, Jr. | 340/479 |

Primary Examiner—Donnie L. Crosland
Attorney, Agent, or Firm—Richard F. Carr; Allan Rothenberg; Richard L. Gausewitz

[57] ABSTRACT

A vehicle brake light and display system employs a display screen having an array of light emitting diodes arranged to transmit a selected pattern or message in red light. A fixed or programmable memory has sets of data stored therein that can be selectively extracted to energize certain of the light emitting elements and display a single line of a selected message. Upon actuation of the brake of the vehicle in which the display screen is mounted, display of the message is disabled, and all of the light emitting elements are energized to provide a solid display of red over the entire screen. As a further safety feature, the display is maintained in a disable condition until initial application of the brake, and thereafter subsequent applications of the brake will cause display of the brake light over the entire display panel.

14 Claims, 1 Drawing Sheet

COMBINED MESSAGE DISPLAY AND BRAKE LIGHT

BACKGROUND OF THE INVENTION

The present invention relates to vehicle display systems, and more particularly concerns an improved combination of message display and brake light.

Recent improvements in brake lights for automobiles and other motor vehicles include the addition of an eye level light mounted within the automobile passenger compartment on a back shelf or on or near a trunk lid or roof of the vehicle. Some of these brake lights, when activated, will display the words "Stop" or an equivalent, but all provide a lighted display only when the brake is applied. There also have been provided vehicle display signs that form a message display that can be seen from a following vehicle. However, these display signs, at best, interfere with display of stop signals provided by the standard brake lights, which are not connected with the message displays. In fact, the presence of such lighted message displays may actually distract a following driver and decrease effectivity of the conventional vehicle stop light system.

Accordingly, it is an object of the present invention to provide a combination of vehicle display and brake light system which avoids or minimizes above-mentioned problems.

SUMMARY OF THE INVENTION

In carrying out principles of the present invention in accordance with a preferred embodiment thereof, a display screen adapted to be mounted at the rear of a vehicle includes an array of light emitting elements for transmitting a selected pattern of light in response to energization of different elements by means of a selected set of stored data under control of a control unit. The same display screen also is employed as a brake light by connecting it to the conventional brake actuating sensor switch. A signal from the brake sensor switch is connected to disable or over-ride display of the selected message and to energize all or a major number of the light emitting elements so that all or most of the display screen will emit red light upon application of the vehicle brake. The display is maintained in a disabled condition until a first actuation of the brake. Thereafter, each subsequent actuation of the brake will disable the display and light the entire screen with its red light.

DETAILED DESCRIPTION OF THE INVENTION

Figure 1:
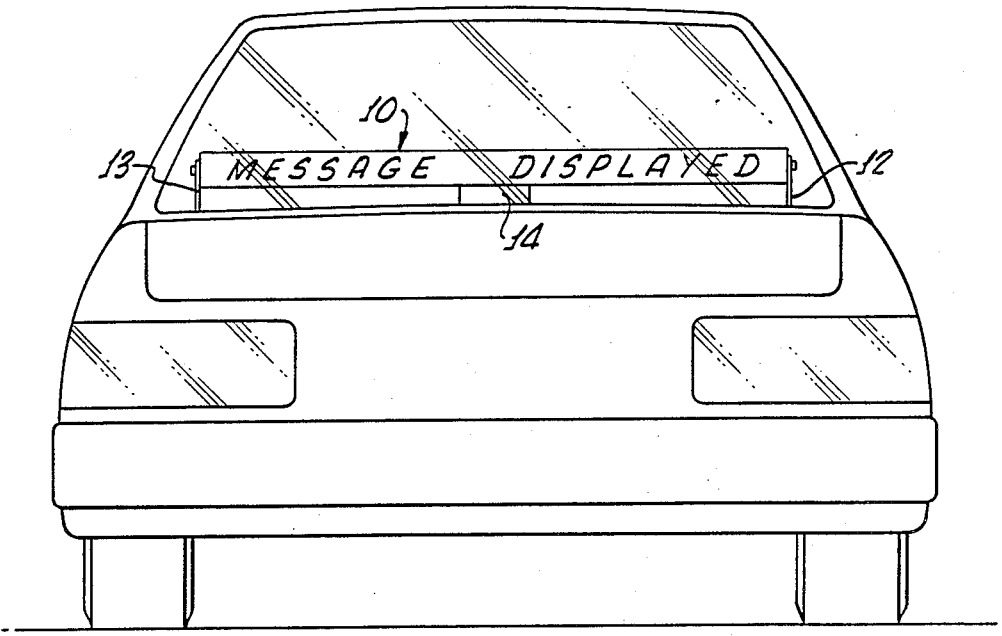
FIG. 1 illustrates the rear of a vehicle having a display screen and brake light embodying principles of the present invention.

A display embodying principles of the present invention is illustrated in FIG. 1 as comprising a narrow, elongated display panel 10 detachably mounted by suitable brackets 12, 13 to the rear deck of the inside passenger compartment of a motor vehicle, such as an automobile. It will be readily understood, of course, that the illustrated mounting brackets are merely exemplary of many different types of mountings that may be applied, including suction cups or other devices that may detachably secure the panel 10 to either the rear deck or to the glass of the rear window. The panel extends for substantially the full length of the window and has a relatively small height so as to minimize obstruction to rear view by the driver. An exemplary display panel may have a width of forty inches, height of one and one-half to two inches, and a thickness of one inch, having a two inch sun shade (not shown) extending across the full panel width. The panel mounts an array of a number of rows and columns of light emitting elements, such as light emitting diodes, spaced close to one another over the entire area or nearly the entire area of the panel. A transparent red cover extends over the panel at its rearward side so as to transmit only red light from the diodes. If desired, the display panel is mounted above the surface of the deck of the vehicle by a small amount to improve the display, and a housing 14 is mounted to the lower side of a central portion of the panel. The housing carries suitable control and energizing wires to the display elements and certain electronic display controls as may be necessary or desirable.

Suitable electronic controls, including a processor (central processing unit, e.g., CPU) and memory, to be described more particularly below, may be mounted at any suitable location, such as in housing 14, for example, for control of the panel to provide a desired display of a message or brake light, as appropriate. The controls are arranged to light selected groups of the elements of the array of light emitting diodes so as to provide a single line of a personal or commercial advertising message containing one or more words. A message of several lines in length is provided by displaying each single line of the message separately for a short period of time, such as five seconds, for example, and then displaying each succeeding line, for the same length of time, until all of the message lines have been completed. Provision is made to display a default message, such as "Drive Safely" or the like at the end of each message, so that, for example, each of the lines of a given message may be successively displayed, with display of the default message following display of the last message line. The default message may comprise one or more lines. Thereafter the same or different message may be displayed as desired.

A significant feature of the present invention is the combination of the described display with a display of brake light. The message being displayed on panel 10 is automatically and instantaneously interrupted and replaced by a full panel brake light when the vehicle brake is applied. To this end the panel and its control electronics ar arranged so that upon actuation of the brakes of the vehicle in which the display is mounted, a signal is sent to the display and its control electronics that will energize all or substantially all of the light emitting elements of the entire display panel, thereby over-riding any displayed message. Energization of all of these elements provides a complete solid red band, or, effectively, a solid brake light extending for the full area of the panel. The energization of all of the lights inherently disables display of any message. Alternatively, the message display control electronics may be directly disabled by the same brake light signal that energizes all of the light emitting elements of the array.

This alternative display of message and brake light, interrupting the message to show the full width brake light, provides a major safety feature. Safety is enhanced by the fact that a driver behind the vehicle bearing the disclosed display and brake light is not distracted by the displayed message when the brakes of the display bearing vehicle are actuated. Not only is any distraction of the displayed message eliminated, but the displayed message, having initially drawn the following driver's attention to the display panel itself, enhances perception of the stop signal communicated by the activation of all of the light emitting diodes over the entire panel display. This is so since the following driver's attention has been drawn to the display panel, which then shows totally red when the brakes are applied.

The described embodiment incorporates an arrangement that prevents a driver from tampering with the safety feature of this display, namely the lighting of the entire panel and disabling of the display upon actuation of the brakes. Such an attempt at tampering might be accomplished by severing a signal line from the brake actuating switch to the display. This would allow a message to be displayed but would prevent display of a brake light by the panel. However, the system is arranged to discourage or preclude such tampering attempt by an arrangement in which control electronics of the system maintain the display in a disabled, inoperable condition, after power has been turned on, until the first signal from the brake actuation switch (actuated by depression of the brake pedal of the vehicle). Thus a first signal from the brake actuation switch is necessary to enable the display, and, upon termination of such first brake signal, the display may operate in its normal condition, projecting single line or single line at a time messages, which are interrupted for display of the brake light over the entire panel display area upon actuation of the vehicle brake. This safety feature will also prevent inadvertent operating of the display in the case of an electrical malfunction.

Figure 2:
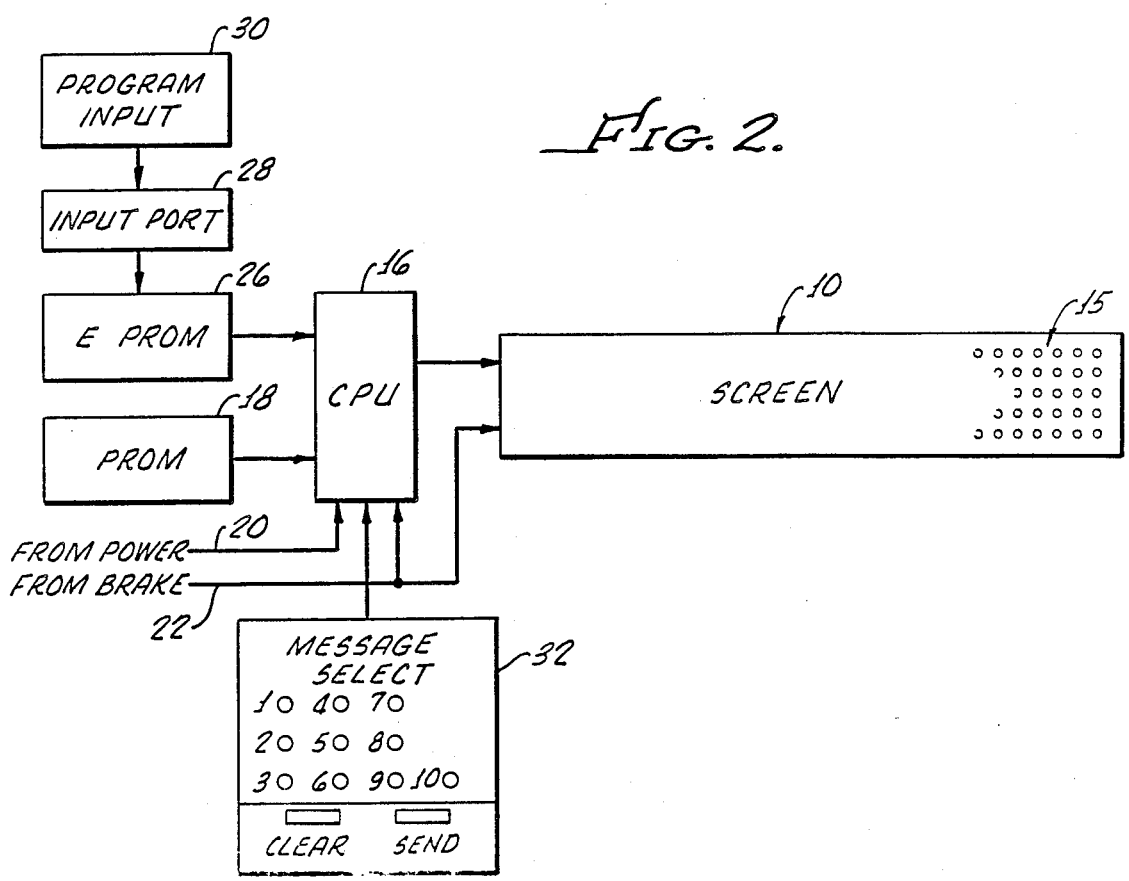
FIG. 2 is a simplified block diagram of the display screen and controls therefor.

Referring now to FIG. 2, display panel 10 mounts an array of columns and rows of light emitting diodes 15 beneath its transparent rearward facing red cover and is controlled by a central processing unit 16 which extracts sets of data signals from a programmable read-only memory or PROM 18. The array of diodes extends over the entire area of the display panel. Memory 18 is preprogrammed to permanently store sets of data for a number of different messages. The memory includes a number of different memory areas, each of which stores a set of data that is arranged, when extracted and decoded by the control unit 16, to send a set of signals to the display panel that energizes selected ones of the light emitting elements to form a pattern of lights defined by the data set that has been extracted by the processing unit 16. Electrical power is supplied from a suitable power supply, such as the vehicle battery (not shown), via a line 20 to the processing unit 16, and thereby to the panel 10 and the display or light emitting elements thereof. The battery power is supplied through the vehicle ignition switch or a separate manually actuated switch (not shown) to shut off the display when the vehicle is not in use.

A brake signal from a standard brake light switch (not shown) is provided on a line 22 and fed to both the display panel 10 and to the processing unit 16. As previously mentioned, this brake signal (which occurs whenever the vehicle brake is actuated) signals the CPU to disable the display of a message and concomitantly effects energization of all or a major number of the light emitting display elements of the display panel. Full panel energization, for brake light display, may be accomplished by feeding the brake signal from line 22 directly to a control circuit (not shown) in the panel display, or solely to the CPU which will energize all light emitting elements of the display. Thus, should the brakes be applied, as the vehicle is moving along and the panel is displaying a desired message, the message is no longer displayed, but the entire panel area is lit in red. Upon release of the brakes, message display operation resumes at the point in the message at which it was interrupted. Alternatively, the CPU logic may be arranged to cause the interrupted message to start over again when the brake is released.

The processing unit 16 includes logic that disables operation of display panel 10 until a first signal (after turning on power to the unit) on line 22 from the brake switch has been received. Upon receipt of the first signal after turning on the power via line 20, the screen is enabled by the processing unit and a selected message may be displayed. Thereafter, subsequent applications of the vehicle brake and subsequent receipt of a brake signal on line 22 will operate as previously described to disable the display and light the entire panel in red.

In some embodiments of the present invention the system also includes a second memory 26 having an input port 28 for reception of programming signals from a suitable programming input source 30. This second memory may take the form of an erasable programmable read only memory (EPROM) that can be programmed by the vehicle owner. The entire apparatus may be readily removed from the vehicle, by disconnecting its detachable mounting brackets, and transported to a suitable location for connection to a programming device, via serial port communications, such as a standard personal micro computer. The computer is arranged with appropriate software to insert and store within the programmable memory 26 sets of data that define messages selected by the programmer.

Each of the memories 18 and 26, the read-only memory and the programmable memory, may contain sets of data collectively defining as many as one hundred or more individually different messages. A selected one of the individual messages is extracted from memory by the control unit 16 under a command received from a message selector 32. The message selector is provided with a keyboard having manually operable control buttons for sending to the control unit a message identifying signal in the form of a number selected by the user, such as any number from 1 to 99 (or higher) for example. The selected number is decoded by the control unit to identify a single one of the messages stored in the memory, and the data for the message so stored is then extracted by the control unit for display or repetitive display by the display panel 10.

The control electronics, except for the message selector 32, may all be mounted within the housing 14 that is attached to the display panel and connected by suitable electrical connections to the power supply, brake light and the message selector 32. The latter, of course, may be mounted adjacent the driver's seat to facilitate selection by the driver of a desired message. Wireless remote control of message selection may be employed if desired. It is contemplated that the display may provide messages in multiple colors, or colors other than red, although the braking signal display will still cause a completely red panel.

If deemed necessary or desirable in order to promote greater visibility of the lighted display in daylight, a suitable sun shield (not shown) may be mounted to the top rear facing portion of the display panel and extend to the vehicle rear window. Further, the display panel may be mounted at other locations on the vehicle, on any suitable exterior vehicle panel or part.

The foregoing detailed description is to be clearly understood as given by way of illustration and example only, the spirit and scope of this invention being limited solely by the appended claims.

I claim:

1. A combined vehicle brake light and message display apparatus comprising:
    a display screen adapted to be mounted at the rear of a vehicle, said screen comprising an array of light emitting elements and means for transmitting light from said elements,
    message display control means for selectively energizing different ones of said elements to form a selected pattern of transmitted light, said display control means comprising:
        memory means for storing a plurality of sets of data, each set representing an individual message,
        control unit means for transmitting a selected set of data from said memory means to said display screen for causing said elements to display a message, and
        said control unit means including brake signaling means responsive to a vehicle brake signal for disabling display of said message and energizing at least a major number of said elements in a stop pattern.

2. The apparatus of claim 1 wherein said brake signaling means comprises means for interrupting said message display and lighting substantially all of said light emitting elements to form a solid brake light display over at least a major area of said screen.

3. The apparatus of claim 1 including means for causing said array of light emitting elements to display a default message after each display of a selected message.

4. The apparatus of claim 1 wherein said control unit means comprises means for disabling said display prior to receipt of a first brake signal.

5. The apparatus of claim 1 wherein light transmitted from each of said elements is red.

6. The apparatus of claim 1 including a message selector having a keyboard, said selector including means responsive to operation of said keyboard for transmitting a message identifying signal to said control unit, said control unit including means responsive to said message identifying signal for transmitting to said display screen a set of data signals corresponding responding to said message identifying signal.

7. A method of providing a rearwardly directed message from a vehicle comprising the steps of:
    mounting upon a rear portion of the vehicle a display screen having an array of light emitting elements, said array including different groups of elements that form different messages,
    energizing one of said groups of elements to display a message, and
    energizing a major part of said array when brakes of the vehicle are applied, said step of energizing one of said groups to display a message comprising the step of storing sets of data in a memory, each said set representing a message to be displayed, selectively extracting at least one of said sets of data from said memory, and employing the selectively extracted set to energize elements of said array of light emitting elements in a pattern that forms a message represented by the selectively extracted set.

8. A method of providing a rearwardly directed message from a vehicle comprising the steps of:
    mounting upon a rear portion of the vehicle a display screen having an array of light emitting elements,
    providing a plurality of sets of data, each set representing a message to be displayed,
    employing a selected one of said sets to energize a group of said elements to display a message represented by the selected set, and
    energizing a major part of said array when brakes of the vehicle are applied,
    said step of energizing a major part of said array comprising concomitantly interrupting display of said message represented by the selected set.

9. A method of providing a rearwardly directed signal from a vehicle comprising the steps of:
    mounting upon a rear portion of the vehicle a display screen having an array of light emitting elements, said array including different groups of elements that form different messages,
    energizing one of said groups of elements to display a desired message, and
    energizing at least a major part of said array when brakes of the vehicle are applied, said step of energizing one of said groups of elements comprising the step of displaying a multi-line message one line at a time.

10. A method of providing a rearwardly directed signal from a vehicle comprising the steps of:
    mounting upon a rear portion of the vehicle a display screen having an array of light emitting elements said array including different groups of elements that form different messages,
    energizing one of said groups of elements to display a message, and
    maintaining said display screen in disabled condition until a first application of vehicle brakes, and then energizing at least a major number of said elements upon each subsequent application of the vehicle brakes.

11. A method of providing a rearwardly directed message from a vehicle comprising the steps of:
    mounting upon a rear portion of the vehicle a display screen having an array of light emitting elements,
    storing a plurality of sets of data in a memory, each set representing an individual message,
    transmitting one of said sets of data from said memory to said array to cause elements of said array to display a selected message, and
    energizing at least a major number of said elements when brakes of the vehicle are applied.

12. The method of claim 11 including the step of varying at least some of the sets of data stored in said memory, thereby storing sets of data representing different messages.

13. The method of claim 11 including the step of causing said elements to display a default message after each display of a selected message.

14. The method of claim 11 including the step of programming said memory to store sets of data representing different messages.

* * * * *